US012764120B2

(12) United States Patent
Oza

(10) Patent No.: US 12,764,120 B2
(45) Date of Patent: Oct. 13, 2026

(54) MANAGEMENT OF ACCESS TO OBJECT STORAGE SERVICES USING A DIRECTORY SERVICE

(71) Applicant: NetApp, Inc., San Jose, CA (US)

(72) Inventor: Dhairesh Oza, Bangalore (IN)

(73) Assignee: NetApp, Inc., San Jose, CA (US)

( * ) Notice: Subject to any disclaimer, the term of this patent is extended or adjusted under 35 U.S.C. 154(b) by 120 days.

(21) Appl. No.: 18/600,063

(22) Filed: Mar. 8, 2024

(65) Prior Publication Data

US 2025/0286894 A1 Sep. 11, 2025

(51) Int. Cl.
*H04L 9/40* (2022.01)
*H04L 67/1097* (2022.01)

(52) U.S. Cl.
CPC .......... *H04L 63/104* (2013.01); *H04L 63/083* (2013.01); *H04L 67/1097* (2013.01)

(58) Field of Classification Search
CPC ... H04L 63/104; H04L 63/083; H04L 63/065; H04L 9/0833; H04L 67/1097
See application file for complete search history.

(56) References Cited

U.S. PATENT DOCUMENTS 7,103,784 B1 * 9/2006 Brown ................ G06F 21/6218 713/185
8,230,010 B1 * 7/2012 Hardjono .............. H04L 9/0833 709/204
9,300,660 B1 * 3/2016 Borowiec ............... H04L 63/08
11,632,360 B1 * 4/2023 Tan ....................... G06F 3/0622 726/4
2007/0016583 A1 * 1/2007 Lempel ............... G06F 21/6227 707/999.009
2008/0222108 A1 * 9/2008 Prahlad .................. G06Q 10/10 707/E17.084
2011/0010758 A1 * 1/2011 Faitelson .................. H04L 9/32 726/4
2012/0150858 A1 * 6/2012 Ripberger ............. G06F 3/0629 707/E17.089
2013/0024925 A1 * 1/2013 Venkataramani ..... H04L 63/083 726/7
2014/0164774 A1 * 6/2014 Nord ..................... H04L 9/0861 713/171
2016/0301675 A1 * 10/2016 Wiles ...................... A63F 13/73
2017/0012986 A1 * 1/2017 Himberger ............ G06F 3/0671
2019/0361726 A1 * 11/2019 Nakagawa .......... G06F 9/45558
2020/0304511 A1 * 9/2020 Rathore .................. G06F 21/31
2021/0176315 A1 * 6/2021 Seurynck ................ H04L 67/60

* cited by examiner

*Primary Examiner* — Jonathan A Bui
(74) *Attorney, Agent, or Firm* — Jaffery Watson Hamilton & DeSanctis LLP

(57) ABSTRACT

Managing access to stored objects includes receiving, by a storage OS in a computing system, an access key identifier (ID) and access key associated with a user of an object storage service (OSS); determining, by a directory service, whether the user is a member of a group authorized to access a storage object in at least one of a network accessible storage (NAS) volume and an OSS bucket, based at least in part on the access key ID; in response to the user being a group member, attempting to authenticate the user by the storage OS with the directory service based at least on the access key ID and the access key; and in response to the user being authenticated by the directory service, allowing, by the storage OS, access by the user to the storage object stored in at least one of the NAS volume and the OSS bucket.

20 Claims, 6 Drawing Sheets

MANAGEMENT OF ACCESS TO OBJECT STORAGE SERVICES USING A DIRECTORY SERVICE

BACKGROUND

Field

Various embodiments of the present disclosure generally relate to storage systems in computing environments. In particular, some embodiments relate to an approach for managing access to object storage services using directory services in a storage system.

Description of the Related Art

In some computing environments, roles and policies of users of a unified data management application for accessing network accessible storage (NAS) (e.g., NAS accesses using Network File System (NFS) or Common Internet File System (CIFS)), either in on-premises storage resources or cloud storage resources, and of users of a cloud storage service are managed by different management console applications. For example, the unified data management application configures users and roles using a system manager within the unified data management application, but the cloud storage service creates users with authorized access to one or more storage buckets using an identity and access management console within the cloud storage service. However, in use cases where the NAS shared resources (e.g., using NFS or CIFS) are exposed via the cloud storage service, manual administrative set up tasks are required for every cloud storage service user. In some scenarios, a system administrator of the unified data management application needs to authorize the access to, and create the secret key for, each cloud service user on a per cluster basis. This is inefficient and results in an administrative burden on the system administrator.

SUMMARY

Systems and methods are described for leveraging external sources, such as a directory service (e.g., an active directory (AD) and/or a lightweight directory access protocol (LDAP), to overcome the existing siloed approach to unified data management for some NAS situations by providing a frontend capability for accessing cloud storage service objects using a directory service and allowing a username and password to be used to authenticate cloud storage service users (instead of cloud storage service secret keys). For example, a username and password may be authenticated against the directory service and cached for subsequent use in authenticating the user via a cloud storage service protocol. According to one embodiment, capabilities are provided to use directory service and/or LDAP groups in cloud storage service policies to make authorization decisions and use a LDAP fast binding function to authenticate cloud storage service requests. The username and password may be passed to the cloud storage service using a cloud storage service secret key and may be used to authenticate the cloud storage service user. These enhancements to support users, and groups of users, from external sources, such as the directory server and/or LDAP, may be useful for scenarios where NFS or CSIF resources are exposed via any cloud storage service client.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
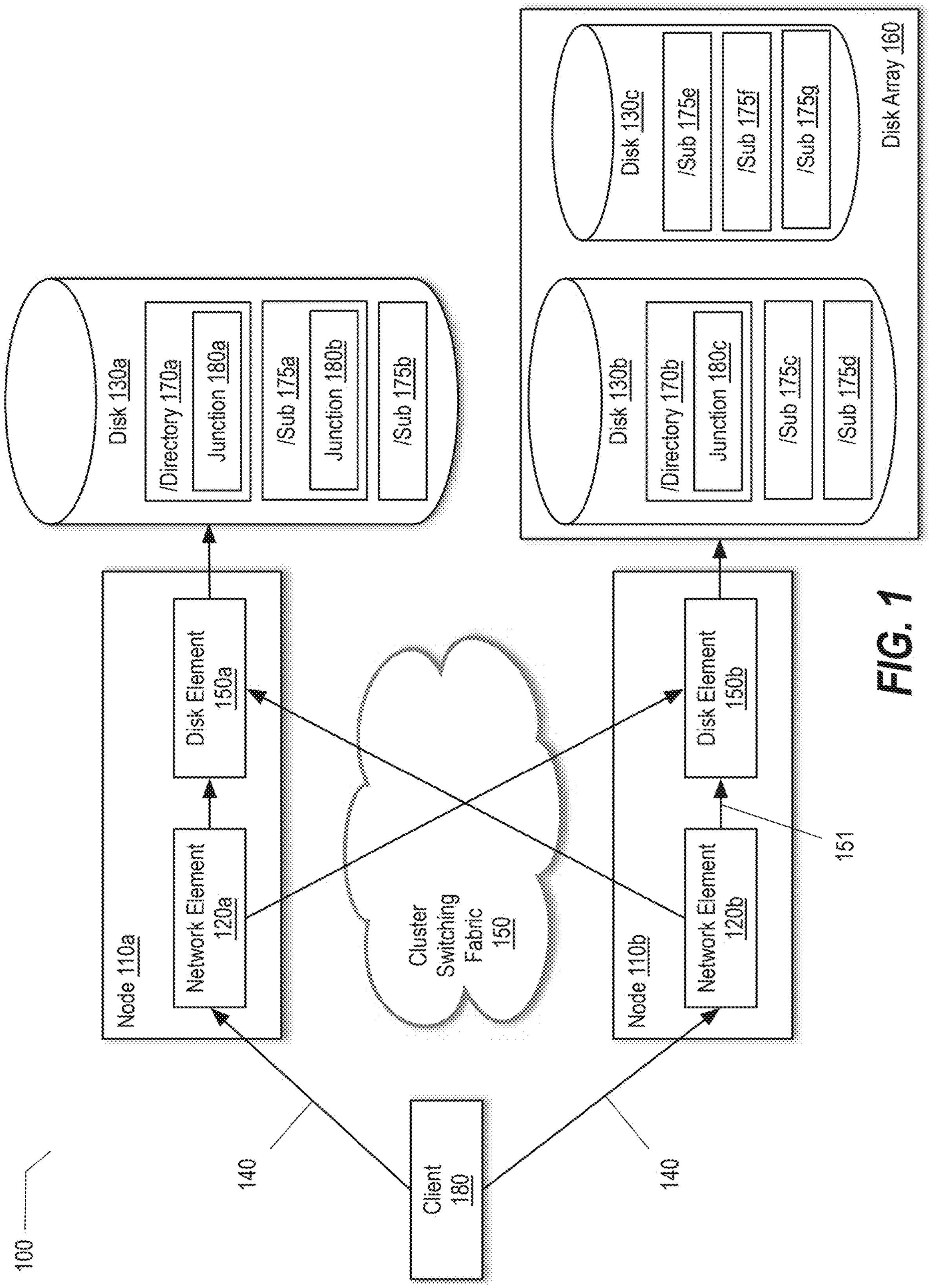
FIG. 1 illustrates a plurality of nodes interconnected as a cluster according to an embodiment of the present disclosure.

Systems and methods are described to authenticate users for accessing stored objects in a storage system in a dual protocol scenario. Various embodiments described herein seek to significantly reduce the amount of time for a system administrator to authenticate users and avoids existing manual administrative tasks to create the access to, and the secret key for, each user of object storage services for each cluster.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the public, may be owned, managed, and operated by a cloud provider or hyper-scaler (e.g., a business, academic, or government organization, or some combination of them), and exists on the premises of the cloud provider. The cloud service provider may offer a cloud-based platform, infrastructure, application, or storage services as-a-service, in accordance with various service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability (e.g., cloud bursting for load balancing between clouds).

As used herein, a "storage system" or "storage appliance" generally refers to a type of computing appliance or node, in virtual or physical form, that provides data to, or manages data for, other computing devices or clients (e.g., applications). The storage system may be part of a cluster representing a distributed storage system. In various examples described herein, a storage system may be run (e.g., on a VM or as a containerized instance, as the case may be) within a public cloud provider.

As used herein a "cloud volume" generally refers to persistent storage that is accessible to a virtual storage system by virtue of the persistent storage being associated with a compute instance in which the virtual storage system is running. A cloud volume may represent a hard-disk drive (HDD) or a solid-state drive (SSD) from a pool of storage devices within a cloud environment that is connected to the compute instance through Ethernet or Fibre channel (FC) switches as is the case for network-attached storage (NAS) or a storage area network (SAN). Non-limiting examples of cloud volumes include various types of SSD volumes (e.g., Amazon Web Services (AWS) Elastic Block Store (EBS) gp2, gp3, io1, and io2 volumes for EC2 instances) and various types of HDD volumes (e.g., AWS EBS st1 and sc1 volumes for EC2 instances).

An "aggregate" generally refers to an object that presents a collection of disks under a contiguous namespace, organized into one or more RAID groups.

As used herein, a "flexible volume" generally refers to a type of storage volume that may be efficiently distributed across multiple storage devices. A flexible volume may be capable of being resized to meet changing business or application requirements. In some embodiments, a storage system may provide one or more aggregates and one or more storage volumes distributed across a plurality of nodes interconnected as a cluster. Each of the storage volumes may be configured to store data such as files and logical units. As such, in some embodiments, a flexible volume may be comprised within a storage aggregate and further comprise at least one storage device. The storage aggregate may be abstracted over a RAID plex where each plex comprises a RAID group. Moreover, each RAID group may comprise a plurality of storage disks. As such, a flexible volume may comprise data storage spread over multiple storage disks or devices. A flexible volume may be loosely coupled to its containing aggregate. A flexible volume can share its containing aggregate with other flexible volumes. Thus, a single aggregate can be the shared source of all the storage used by all the flexible volumes contained by that aggregate. A non-limiting example of a flexible volume is a NetApp ONTAP Flex Vol volume.

As used herein, a "flexgroup volume" generally refers to a single namespace that is made up of multiple constituent/member volumes. A non-limiting example of a flexgroup volume is a NetApp ONTAP FlexGroup volume that can be managed by storage administrators, and which acts like a NetApp Flex Vol volume. In the context of a flexgroup volume, "constituent volume" and "member volume" are interchangeable terms that refer to the underlying volumes (e.g., flexible volumes) that make up the flexgroup volume.

Example Distributed Storage System Cluster

FIG. 1 illustrates a plurality of nodes interconnected as a cluster according to an embodiment of the present disclosure. The nodes 110*a-b* comprise various functional components that cooperate to provide a distributed storage system architecture of cluster 100. To that end, in the context of the present example, each node is generally organized as a network element (e.g., network element 120*a* or 120*b*) and a disk element (e.g., disk element 150*a* or 150*b*). The network element includes functionality that enables the node to connect to clients (e.g., client 180) over a computer network 140, while each disk element 350 connects to one or more storage devices, such as disks 130 of a disk array 160. The nodes 110*a-b* are interconnected by a cluster switching fabric 151 which, in an example, may be embodied as a Gigabit Ethernet switch. It should be noted that while there is shown an equal number of network and disk elements in the illustrative cluster 100, there may be differing numbers of network and/or disk elements. For example, there may be a plurality of network elements and/or disk elements interconnected in a cluster 100 configuration that does not reflect a one-to-one correspondence between the network and disk elements. As such, the description of a node comprising one network element and one disk element should be taken as illustrative only.

Clients may be general-purpose computing systems configured to interact with the node in accordance with a client/server model of information delivery. That is, each client (e.g., client 180) may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel protocol (FCP), when accessing information in the form of blocks. In various examples described herein, an administrative user (not shown) of the client may make use of a user interface (UI) presented by the cluster or a command line interface (CLI) of the cluster to, among other things, manage access by clients to nodes and disks.

Disk elements 150*a* and 150*b* are illustratively connected to disks 130*a-c* (which may be referred to collectively as disks 130), that may be organized into disk arrays 160. Alternatively, storage devices other than disks may be utilized, e.g., flash memory, optical storage, solid state devices, etc. As such, the description of disks should be taken as exemplary only. As described below, in reference to FIG. 3, a file system may implement multiple flexible volumes on the disks 130. Flexible volumes may comprise multiple directories 170*a-b* and multiple subdirectories 175*a-g*. Junctions 180*a-c* may be located in directories 170 and/or subdirectories 175. It should be noted that the distribution of directories 170, subdirectories 175 and junctions 180*a*, 180*b* shown in FIG. 1 is for illustrative purposes. As such, the description of the directory structure relating to subdirectories and/or junctions should be taken as exemplary only.

Example Storage System Node

Figure 2:
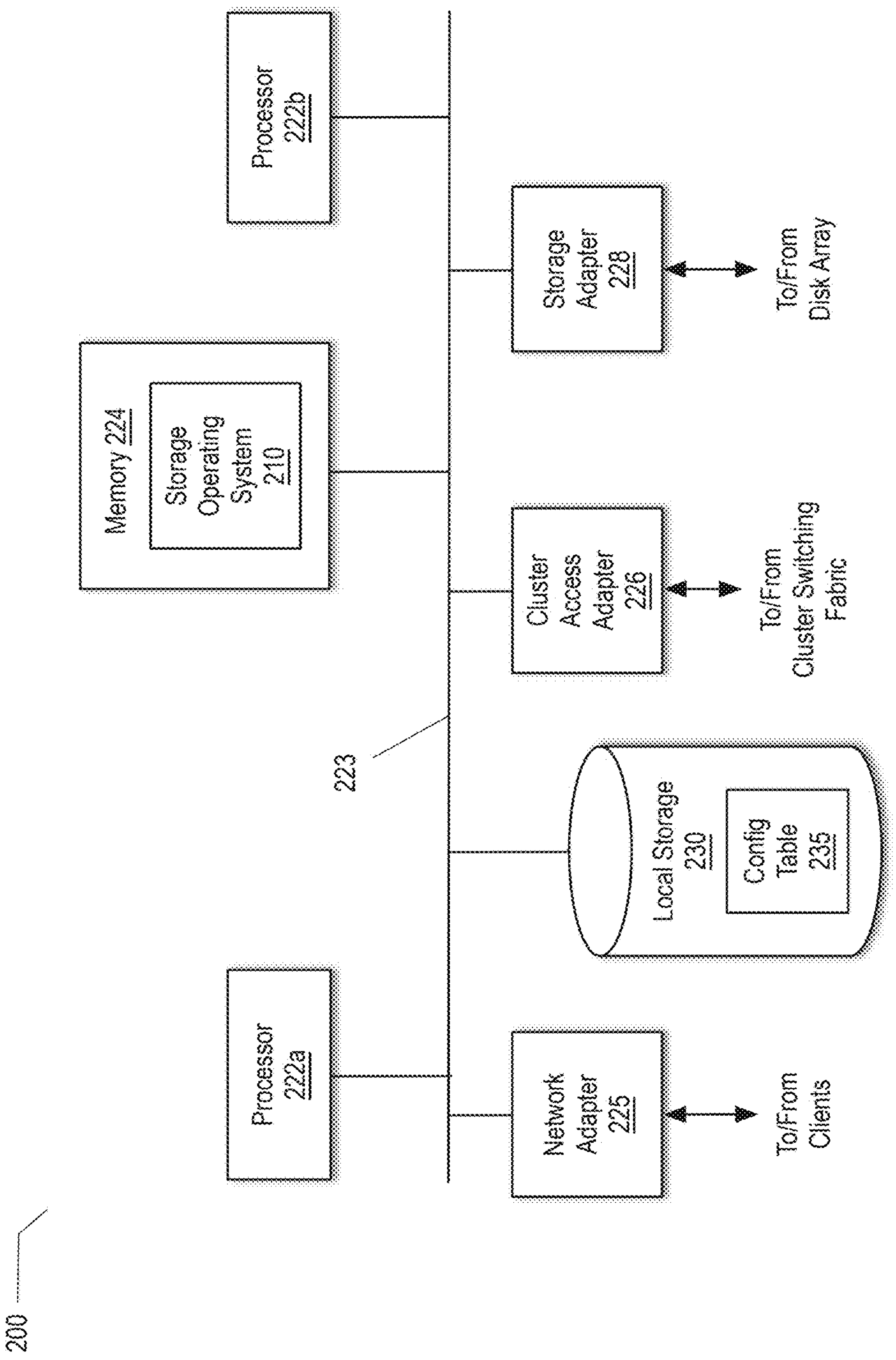
FIG. 2 illustrates a node according to an embodiment of the present disclosure.

FIG. 2 illustrates a node according to an embodiment of the present disclosure. FIG. 2 shows a block diagram of a node 200 that is illustratively embodied as a storage system comprising a plurality of processors (e.g., processors 222*a-b*, also referred to herein as processor circuitry), a memory 224, a network adapter 225, a cluster access adapter 226, a storage adapter 228 and local storage 230 interconnected by a system bus 223.

Node 200 may be analogous to nodes 110*a* and 110*b* of FIG. 1. The local storage 230 comprises one or more storage devices, such as disks, utilized by the node to locally store configuration information (e.g., in configuration table 235). The cluster access adapter 226 comprises a plurality of ports adapted to couple the node 200 to other nodes of the cluster (e.g., cluster 100). Illustratively, Ethernet is used as the clustering protocol and interconnect media, although it will be apparent to those skilled in the art that other types of protocols and interconnects may be utilized within the cluster architecture described herein. Alternatively, where the network elements and disk elements are implemented on separate storage systems or computers, the cluster access adapter 226 is utilized by the network and disk element for communicating with other network and disk elements in the cluster.

In the context of the present example, each node 200 is illustratively embodied as a dual processor storage system executing a storage operating system (OS) 210 that implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor (e.g., processor 222*a* (processor circuitry)) may execute the functions of the network element (e.g., network element 120*a* or 120*b*) on the node, while the other processor (e.g., processor 222*b*) may execute the functions of the (e.g., disk element 150*a* or 150*b*).

Memory 224 illustratively comprises storage locations that are addressable by the processors and adapters for storing software program code and data structures associated with the subject matter of the disclosure. The processor and adapters may, in turn, comprise processing elements and/or logic circuitry configured to execute the software code and manipulate the data structures. The storage operating system 210, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the disclosure described herein.

The network adapter 225 comprises a plurality of ports adapted to couple the node 200 to one or more clients (e.g., client 180) over point-to-point links, wide area networks, virtual private networks implemented over a public network (Internet) or a shared local area network. The network adapter 225 thus may comprise the mechanical, electrical and signaling circuitry needed to connect the node to a network (e.g., computer network 140). Illustratively, the network may be embodied as an Ethernet network or a Fibre Channel (FC) network. Each client (e.g., client 180) may communicate with the node over network by exchanging discrete frames or packets of data according to pre-defined protocols, such as TCP/IP.

The storage adapter 228 cooperates with the storage operating system 210 executing on the node 200 to access information requested by the clients. The information may be stored on any type of attached array of writable storage device media such as video tape, optical, digital video disk (DVD), magnetic tape, bubble memory, electronic random-access memory, micro-electromechanical and any other similar media adapted to store information, including data and parity information. However, as illustratively described herein, the information is stored on disks (e.g., disks 130 of array 160). The storage adapter comprises a plurality of ports having input/output (I/O) interface circuitry that couples to the disks over an I/O interconnect arrangement, such as a conventional high-performance, FC link topology.

Storage of information on each array (e.g., array 160) may be implemented as one or more storage "volumes" that comprise a collection of physical storage disks (e.g., disks 130) cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

While in the context of the present example, the node may be a physical host, it is to be appreciated the node may be implemented in virtual form. For example, a storage system may be run (e.g., on a VM or as a containerized instance, as the case may be) within a public cloud provider. As such, a cluster representing a distributed storage system may be comprised of multiple physical nodes (e.g., node 200) or multiple virtual nodes (virtual storage systems).

Example Storage Operating System

To facilitate access to the disks (e.g., disks 130), a storage operating system (e.g., storage operating system (OS) 300, which may be analogous to storage operating system 210) may implement a write-anywhere file system that cooperates with one or more virtualization modules to "virtualize" the storage space provided by disks. The file system logically organizes the information as a hierarchical structure of named directories and files on the disks. Each "on-disk" file may be implemented as a set of disk blocks configured to store information, such as data, whereas the directory may be implemented as a specially formatted file in which names and links to other files and directories are stored. The virtualization module(s) allow the file system to logically organize information as a hierarchical structure of blocks on the disks that are exported as named logical unit numbers (luns).

Illustratively, the storage operating system 300 may be the Data ONTAP operating system available from NetApp, Inc., San Jose, Calif. that implements a Write Anywhere File Layout (WAFL) file system. However, it is expressly contemplated that any appropriate storage operating system may be enhanced for use in accordance with the inventive principles described herein. As such, where the term "WAFL" is employed, it should be taken broadly to refer to any file system that is otherwise adaptable to the teachings of this disclosure.

Figure 3:
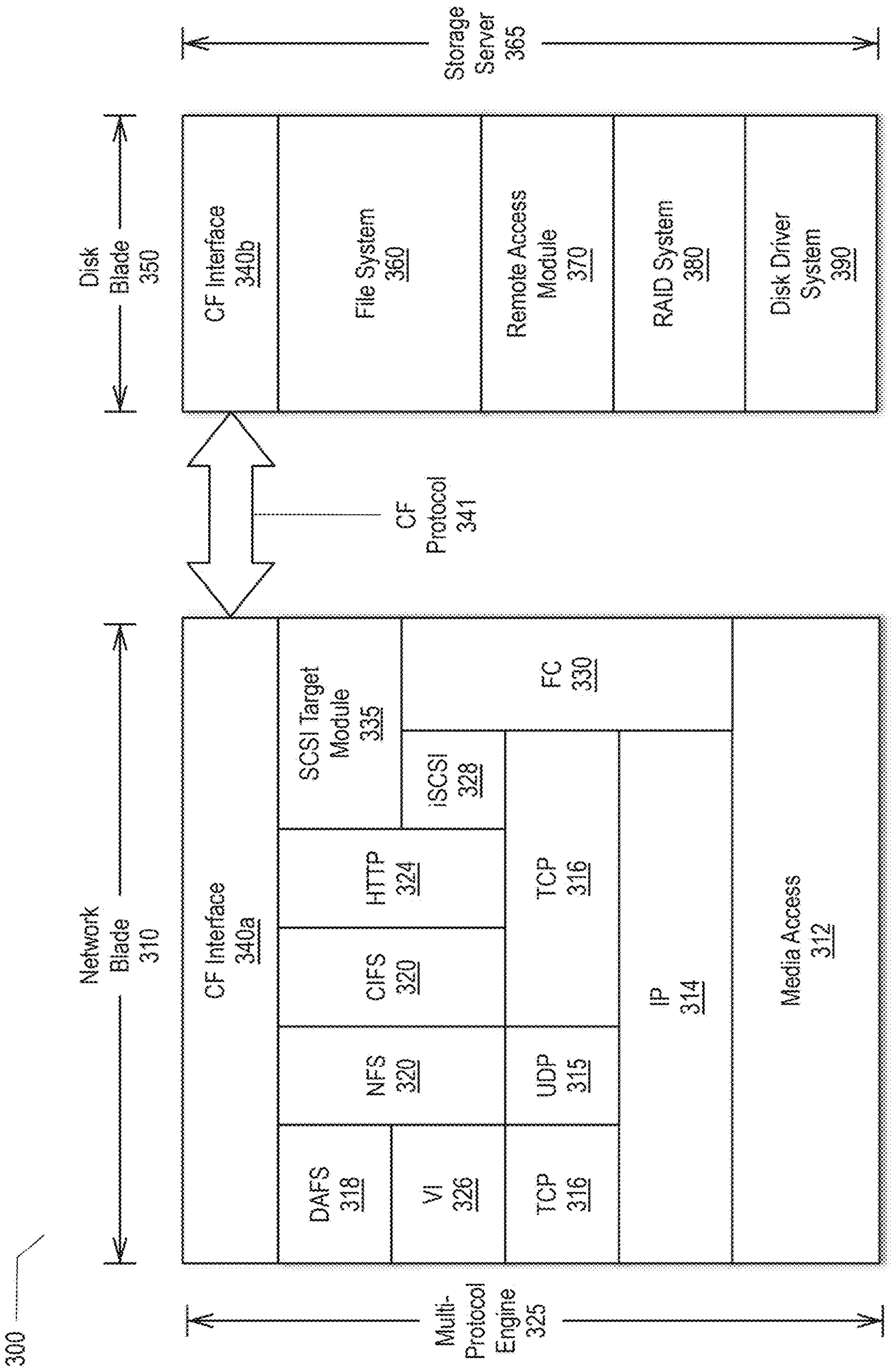
FIG. 3 illustrates a storage operating system according to an embodiment of the present disclosure.

FIG. 3 illustrates a storage operating system according to an embodiment of the present disclosure. In the context of the present example, the storage operating system 300 is shown including a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A virtual interface (VI) layer 326 implements the VI architecture to provide direct access transport (DAT) capabilities, such as remote direct memory access (RDMA), as required by the DAFS protocol 318. An Internet Small Computer Systems Interface (iSCSI) driver layer 328 provides block protocol access over the TCP/IP network protocol layers, while a Fibre Channel (FC) driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FV protocol (FCP) when accessing the blocks on the node (e.g., node 200).

In addition, the storage operating system includes a series of software layers organized to form a storage server 365 that provides data paths for accessing information stored on the disks (e.g., disks 130) of the node. To that end, the storage server 365 includes a file system module 360 in cooperating relation with a remote access module 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage operating system 300 through the interaction with one or more virtualization modules illustratively embodied as, for example, a virtual disk (vdisk) module (not shown) and a SCSI target module 335. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements an exemplary a file system having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from a client (e.g., client 180) is forwarded as a packet over a computer network (e.g., computer network 140) and onto a node (e.g., node 200) where it is received at a network adapter (e.g., network adaptor 225). A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

The remote access module 370 is operatively interfaced between the file system module 360 and the RAID system module 380. Remote access module 370 is illustratively configured as part of the file system to implement the functionality to determine whether a newly created data container, such as a subdirectory, should be stored locally or remotely. Alternatively, the remote access module 370 may be separate from the file system. As such, the description of the remote access module being part of the file system should be taken as exemplary only. Further, the remote access module 370 determines which remote flexible volume should store a new subdirectory if a determination is made that the subdirectory is to be stored remotely. More generally, the remote access module 370 implements the heuristics algorithms used for the adaptive data placement. However, it should be noted that the use of a remote access module should be taken as illustrative. In alternative aspects, the functionality may be integrated into the file system or other module of the storage operating system. As such, the description of the remote access module 370 performing certain functions should be taken as exemplary only.

It should be noted that the software "path" through the storage operating system layers described above needed to perform data storage access for the client request received at the node may alternatively be implemented in hardware. That is, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Alternatively, the processing elements of adapters 225, 228 may be configured to offload some or all the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computing system to perform a storage function that manages data access and may, in the case of a node (e.g., node 200), implement data access semantics of a general-purpose operating system. The storage operating system can also be implemented as a microkernel, an application program operating over a general-purpose operating system, such as UNIX or Windows NT, or as a general-purpose operating system with configurable functionality, which is configured for storage applications as described herein.

In addition, it will be understood to those skilled in the art that aspects of the disclosure described herein may apply to any type of special-purpose (e.g., file server, filer or storage serving appliance) or general-purpose computing system, including a standalone computing system or portion thereof, embodied as or including a storage system. Moreover, the teachings contained herein can be adapted to a variety of storage system architectures including, but not limited to, a network-attached storage environment, a storage area network and disk assembly directly attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the subject matter may be utilized with any suitable file system, including a write in place file system.

Example Cluster Fabric (CF) Protocol

Illustratively, the storage server 365 is embodied as disk element (or disk blade 350, which may be analogous to disk element 150*a* or 150*b*) of the storage operating system 300 to service one or more volumes of array 160. In addition, the multi-protocol engine 325 is embodied as network element (or network blade 310, which may be analogous to network element 120*a* or 120*b*) to (*i*) perform protocol termination with respect to a client issuing incoming data access request packets over the network (e.g., network 140), as well as (ii) redirect those data access requests to any storage server 365 of the cluster (e.g., cluster 100). Moreover, the network element 310 and disk element 350 cooperate to provide a highly scalable, distributed storage system architecture of the cluster. To that end, each module includes a cluster fabric (CF) interface module (e.g., CF interface 340*a* and 340*b*) adapted to implement intra-cluster communication among the modules, including disk element to disk element communication for data container striping operations described herein.

The protocol layers, e.g., the NFS/CIFS layers and the iSCSI/IFC layers, of the network element 310 function as protocol servers that translate file-based and block-based data access requests from clients into CF protocol messages used for communication with the disk element 350. That is, the network element servers convert the incoming data access requests into file system primitive operations (commands) that are embedded within CF messages by the CF interface module 340 for transmission to the disk elements of the cluster. Notably, the CF interface modules 340 cooperate to provide a single file system image across all disk elements in the cluster. Thus, any network port of a network element that receives a client request can access any data container within the single file system image located on any disk element of the cluster.

Further, in an illustrative aspect of the disclosure, the network element and disk element are implemented as separately scheduled processes of storage operating system 300; however, in an alternate aspect, the modules may be implemented as pieces of code within a single operating system process. Communication between a network element and disk element is thus illustratively implemented through the use of message passing between the modules although, in the case of remote communication between a network element and disk element of different nodes, such message passing occurs over a cluster switching fabric (e.g., cluster switching fabric 151). A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp, Inc.

The CF interface module 340 implements the CF protocol for communicating file system commands among the modules of cluster. Communication is illustratively implemented by the disk element exposing the CF API to which a network element (or another disk element) issues calls. To that end, the CF interface module 340 is organized as a CF encoder and CF decoder. The CF encoder of, e.g., CF interface 340*a* on network element 310 encapsulates a CF message as (i) a local procedure call (LPC) when communicating a file system command to a disk element 350 residing on the same node 200 or (ii) a remote procedure call (RPC) when communicating the command to a disk element residing on a remote node of the cluster 100. In either case, the CF decoder of CF interface 340*b* on disk element 350 de-encapsulates the CF message and processes the file system command.

Illustratively, the remote access module 370 may utilize CF messages to communicate with remote nodes to collect information relating to remote flexible volumes. A CF message is used for RPC communication over the switching fabric between remote modules of the cluster; however, it should be understood that the term "CF message" may be used generally to refer to LPC and RPC communication between modules of the cluster. The CF message includes a media access layer, an IP layer, a UDP layer, a reliable connection (RC) layer and a CF protocol layer. The CF protocol is a generic file system protocol that conveys file system commands related to operations contained within client requests to access data containers stored on the cluster; the CF protocol layer is that portion of a message that carries the file system commands. Illustratively, the CF protocol is datagram based and, as such, involves transmission of messages or "envelopes" in a reliable manner from a source (e.g., a network element 310) to a destination (e.g., a disk element 350). The RC layer implements a reliable transport protocol that is adapted to process such envelopes in accordance with a connectionless protocol, such as UDP.

Dual Protocol Access to Stored Objects

In data management applications, flexibility and ease of access are useful features for users. As described above with reference to FIG. 3, storage operating system (OS) 300 may be used to manage files and storage objects efficiently in a heterogeneous computing environment. However, system administrators often face the challenge of managing two identities for data access. This complexity has been a substantial hurdle in providing a seamless data management capability. According to embodiments of the present disclosure, storage OS 300 introduces support for a directory service to assist in managing access to object storage services, thereby streamlining the process of managing user identities and identity management in a dual protocol scenario.

In some embodiments, storage OS 300 may be implemented (as noted above) as the ONTAP data management application available from NetApp, Inc., the directory services may be implemented by the Active Directory (AD) service available from Microsoft Corporation, the Lightweight Directory Access Protocol (LDAP) is available from Microsoft Corporation, and the object storage services may be implemented as the Simple Storage Service (S3) available from Amazon.com, Inc., however in other embodiments other data management applications, directory services, directory service protocols, and object storage services may be used. At least a portion of storage OS 300 may also be referenced herein as a unified data management application.

Figure 4:
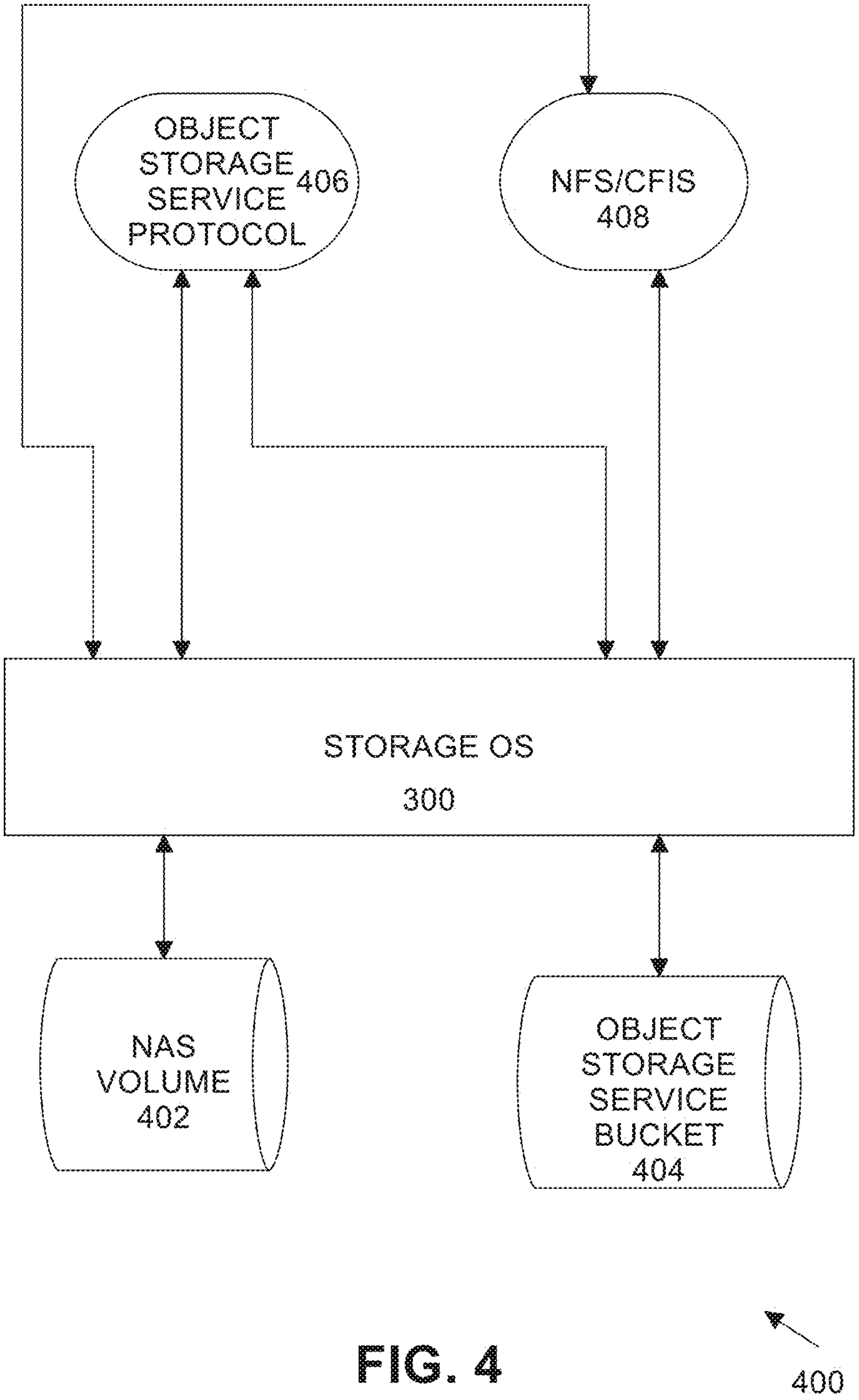
FIG. 4 illustrates dual protocol access to object storage services according to an embodiment of the present disclosure.

FIG. 4 illustrates dual protocol access to stored objects according to an embodiment of the present disclosure. In an embodiment, storage OS 300 manages access to two kinds of stored objects, a NAS volume 402 and an object storage service bucket 404. Storage OS 300 provides management of access to each of the two kinds of stored objects. Bach kind of stored object may be accessed using a protocol. For example, NAS volume 402 may be accessed using NFS/CIFS 408, and object storage service bucket 404 may be accessed using object storage service protocol 406. However, in a dual protocol scenario as supported by embodiments of the present disclosure, NAS volume 402 may also be accessed using object storage service protocol 406 and object storage service bucket 404 may also be accessed using NFS/CIFS 408.

Storage OS 300 provides management of access to object storage services (e.g., to access object storage service bucket 404) using a directory service according to an embodiment of the present disclosure.

Directory services may be used by organizations for centralized identity and access management because directory services provide enhanced security, simplified administration, and scalability. Data management application administrators have relied on directory services for managing access to files. However, introducing object stores created a fork in this established centralized identity management approach, because object storage service protocol 406 used with object storage services does not have inherent support for the directory service.

In some existing computing environments, administrators must manage an independent database for object storage service identities and policies. This is problematic for managing hybrid file and object environments (e.g., causing the dual protocol problem). This dual identity management has posed at least several challenges: 1) Managing two sets of identities (e.g., for using object storage service protocol 406 and NFS/CIFS 408) increases administrative overhead and can be error prone, potentially leading to security risks. 2) The need for separate identities can lead to inefficiencies in user provisioning and deprovisioning, making it a challenge to maintain data security and access control. 3) For end users, navigating these separate identities can be confusing and hinder productivity. In embodiments of the present disclosure, storage OS 300 is integrated with a directory service (such as Active Directory (AD)) to overcome this administrative bottleneck by simplifying user management and enforcing consistent file and storage object access policies.

Thus, in an embodiment, storage OS 300 simplifies access to object storage services with directory services support. Storage OS 300 provides flexible dual protocol access and simplified data management. Storage OS 300 extends this simplicity premise by integrating user authentication and permissions of object storage services with directory service-based users and groups, thereby enhancing data security and access control.

In an embodiment, an administrator may allow users to be authenticated for calling object storage services using an LDAP Fast Bind function (e.g., LDAP fast bind associated with AD by Microsoft Corporation, although other fast bind implementations may also be used). The user's username and password may be passed using the object storage services to authenticate the user. Storage OS 300 provides the capability to use local groups to grant/deny access to object storage services resources. In an embodiment, this capability is extended to allow an administrator to specify groups from the directory service and/or LDAP.

In an embodiment, object storage services protocol users may be authenticated with the directory service. Existing representation state transfer (REST) application programming interfaces (APIs) for object storage services use hypertext transport protocol (HTTP) authorization to pass authentication information. In existing systems, when the administrator creates a local user of the object storage services using storage OS 300, storage OS 300 issues an access key ID (e.g., operating as a username) and an associated access key (e.g., operating as a secret password). In an embodiment, the access key ID may be an identifier value unique to storage OS 300, and the access key may be a pseudo-randomly generated secret value (which may in some embodiments be generated using known Secure Hash Algorithm (SHA) cryptographic methods)). The user's application program provides the access key ID and access key when making a request for an object storage service to be performed (e.g., for accessing a stored object). In an embodiment, the authorization header of the request includes the access key ID, access key, and a digital signature. In a request for authentication, the access key ID identifies the object storage services user making the request and the access key used to compute the digital signature.

In an embodiment of the present disclosure, there's no need to create and manage local object storage services users by storage OS 300; instead, users may use existing directory service credentials for authentication purposes. The user's application program can present encoded directory service credentials (that is, the access key ID and access key) in a prescribed format for use of object storage services. In an embodiment, storage OS 300 uses the provided credentials to authenticate a user with directory service using LDAP Fast Bind mode. With Fast Bind functionality, storage OS 300 sends user credentials (e.g., access key ID and access key) to an LDAP server (not shown in FIG. 4) through a secure communications connection. The LDAP server then validates these credentials and informs storage OS 300 whether the request is from a valid user.

Figure 5:
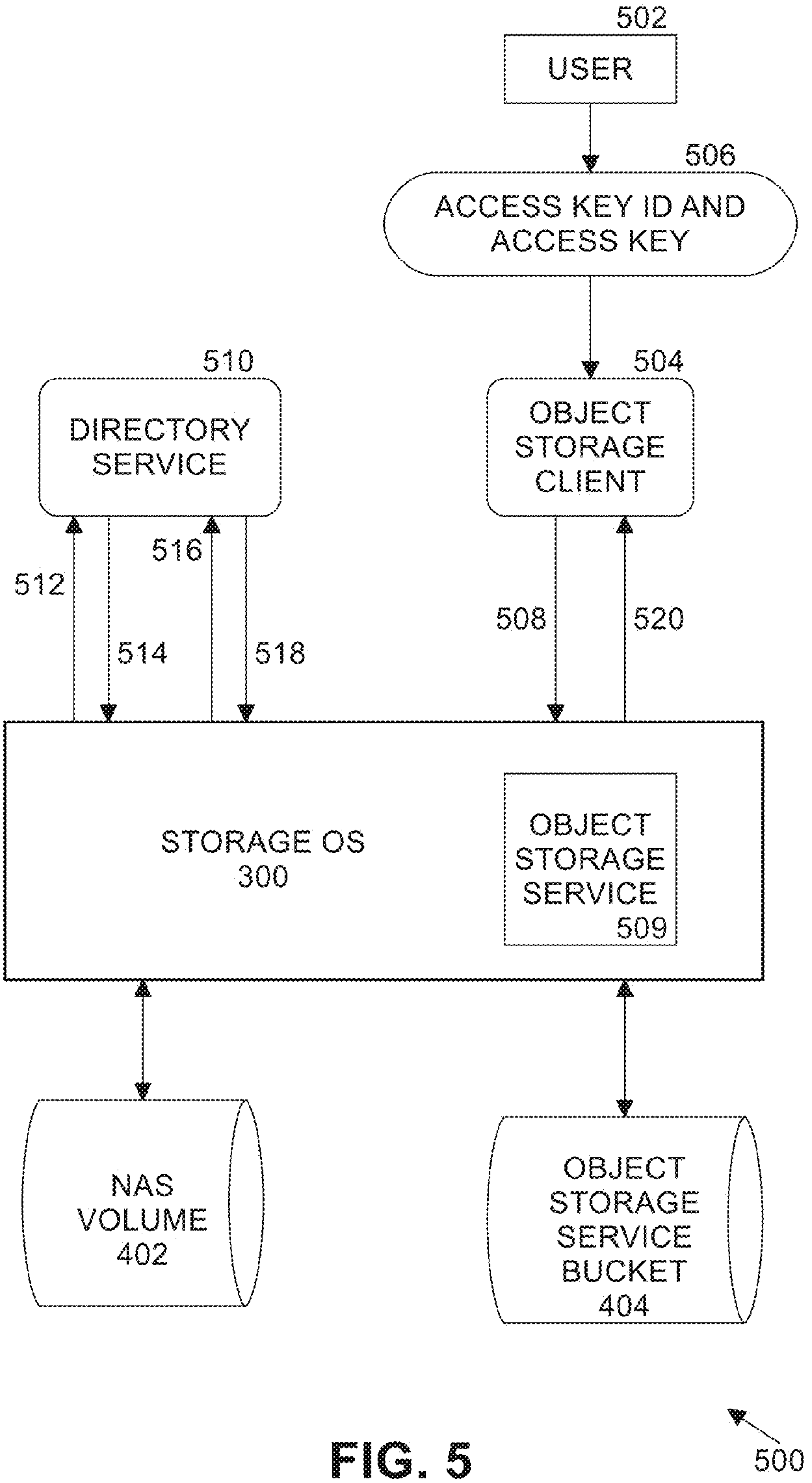
FIG. 5 illustrates management of access to object storage services using a directory service according to an embodiment of the present disclosure.

FIG. 5 illustrates management of access to object storage services using a directory service according to an embodiment of the present disclosure. User 502 may provide an access key ID and access key 506 to object storage client 504. Object storage client 504 sends the access key ID and access key to storage OS 300 (arrow 508), Object storage service 509 of storage OS 300 decodes the received encoded access key ID and access key. Object storage service 509 sends a request to directory service 510 to determine if the user identified by the access key ID is a member of a group (arrow 512). Object storage service 509 receives the group membership status information (arrow 514) associated with the user identified by the access key ID. Object storage service 509 then attempts to authenticate the user using directory service 510 (arrow 516) (e.g., using the access key ID and access key). Directory service 510 determines the authentication of the user (based on the access key ID and access key) and returns authentication status information (arrow 518). If the user is authenticated and the user is a member of a group authorized to access NAS volume 402 and/or object storage service bucket 404 (e.g., according to an access policy determining read and/or write access), then access by the user to access NAS volume 402 and object storage service bucket 404 is authorized. In an embodiment, this may be implemented as a bind request (e.g., using a Fast Bind mode of LDAP), Object storage service 509 returns the authentication status information to object storage client 504, either allowing or preventing access to a stored object (arrow 520). In an embodiment, once the user is authenticated and access to the stored object is allowed, object storage service 509 also implements a read or write operation as requested by the (now authorized) user using the appropriate protocol (e.g., either the NFS/CIFS protocol or the object storage services protocol). For example, if the requested operation is a read operation, object storage service 509 reads the requested stored object using the appropriate protocol and returns the stored object to object storage client 504 for communication to the user's application. If the requested operation is a write operation, object storage service 509 writes data received from object storage client 504 to the stored object using the appropriate protocol.

To enhance access control and manage permissions effectively, in an embodiment, an administrator may now specify a directory service group in an object storage service bucket policy. This integration allows an administrator to leverage the existing directory service infrastructure to grant or deny access to object storage services resources based on group membership. By associating directory service groups with object storage services bucket policies, user management may be streamlined, access control may be simplified, and users may be authorized for the appropriate level of control, while also maintaining a centralized and organized approach to permission management.

Organizations may choose separate object storage services credentials for end users and still benefit from directory service integration. For large organizations with many users, a storage administrator can become a bottleneck in the provisioning of object storage services credentials. In an embodiment, storage OS 300 enables end users to generate their own object storage services credentials without requiring help from the storage administrator. In an implementation, the end user requests the object storage services credentials by calling a self-service REST API. Object storage service 509 of Storage OS 300 authenticates the credentials of the requesting user with the directory service before creating a local object storage services user and granting object storage services credentials.

Thus, integrating storage OS 300 with directory services for access to object storage services offers a robust approach to data storage and access management. By bridging these technologies, organizations can benefit from a seamless, unified environment that simplifies user authentication while making sure that data is accessible only to authorized users.

In scenarios using only NFS/CIFS (or similar protocols), users may want to leverage existing identity management solutions such as directory services (e.g., AD) and/or LDAP to authenticate users who can perform object storage service requests with third-party and open-source object storage service applications. Object storage service authentication relies on users having an access key ID and access key to authenticate with the server. Clients are expected to provide these values and follow the signature methods to generate an authorization header that is passed with every object storage service REST operation.

In an embodiment, the object storage services commands (e.g., for keys) for a command line interface (CLI) may be configured in a file. Table 1 is an example of the contents of such a file.

Table 1 dhname@cych6rtp03:~>cat.oss/credentials
[default]
oss_access_key_id=IIHKY30BMNZOD8PVKU9Z
oss_secret_access_key=wUz_p9PZAbh91CEZ6_ 8UCKu2871Mj3_C3htIZJ1_
[user1]
oss_access_key_id=10D2V31T3AJ5QJ4JKW8S
oss_secret_access_key=PAomHZv5YFNy3Q_7nZ31-x3TpluyD335Y6Dye3QPy
[rajeev]
oss_access_key_id=8P0AI31RN03EQW9O3699
oss_secret_access_key=S_j_C94_r_3xY320PrBnyNF-KcVr37ii_D09DQBT
[limited_access_user]
oss_access_key_id=BMR57Sbn_8PdbQ2a6lyY3_2QP-N6yKaugTsgCdxPq5njJsH_2bDz_k3J9E022BON96-zMZ Mu_l106WalVw9k03CnTY4DyytYXAZ4_hPwA-6p8ccQ2N4CjqAEh79CX8_38AT
oss_secret_access_key=PbMN65ZFFy8K0g94OQa_1_ QYDj_DhVyoyf_bm5cWDh4KvPKyq55jRN9ds34S_ IgcB57 x0yW381R2rQSOly2AoQc_ E6432CBhA-d8SfM- EbLD48spUP3NeqbnTPfpxAx_r5
[aws]
oss_access_key_id=AKIAJ4RXU5XN5ODKSFTA
oss_secret_access_key=4/BOUC8qKy3FSs6q07I-aQUbWKy/BpKKgzgPjUuqQ
[sgws]
oss_access_key_id=C2NVFXUGPZ6H3J434ZIK
oss_secret_access_key=Zf1Pjkc11HlXev6Yp2mFW0-MsEk/Vcv/Dv8OjUmf3

In an embodiment, the access key ID and access key may each be 128 bytes long. The access key ID may be passed to an object storage client 504 as part of the "Authorization:" header. There are two main restrictions: 1) LDAP schema changes are problematic for users. 2) Given the diversity of clients, the solution should work with any client that supports the access key ID and access key. Since the access key ID is passed to the object storage client 504, this can be passed to the object storage service 509 of storage OS 300. The object storage service 509 may use this information to validate the access key against the directory service and/or LDAP configured for the object storage service 509. If the Fast Bind function succeeds, the user will be granted access to the storage object and a signature hash will not be computed. If audit is enabled and the Fast Bind function fails, an audit event will be generated to return an authentication failed status.

In an embodiment, the access key ID may be presented in this format:

"NTAPFASBIND"+base64-encode (user-name:password). For example:

"NTAPFASTBIND"+base64-encode (dhairesh:mysupersecretpassword);

which results in NTAPFASTBINDZGhhaXJlc- 2g6bXlz-dXBlcnNlY3JldHBhc3N3b3Jk.

As the access key may be derived from the encoded access key ID and access key combination, once the access key is validated, this access key ID will be used for authorization decisions. Since the object storage services protocol communication is over HTTPS, the access key ID and access key combination may be encrypted.

To avoid repeated calls to LDAP, the access key ID/access key information may be cached in an in-memory least recently used (LRU) cache (not shown in FIG. 3) in network blade 310. The access key may be hashed using a salt value and an encryption process such as Secure Hash Algorithm (SHA) 256 and stored in the cache. In an embodiment, the time to live (TTL) for this cache may be defaulted to one hour, for example, and may be modified by the administrator to a maximum value of 12 hours. An advanced mode CLI command may be provided to administrators to flush the cache. A negative cache may also be maintained for the short duration of time, such as one minute. This feature may be enabled by default and administrators can disable the feature using the object-store-server options in the CLI to storage OS 300.

In an embodiment, using directory services and/or LDAP for granting access to object storage services may be implemented as follows. In the existing bucket policy, local groups may be created in storage OS 300 in the "principal" field of a bucket policy. For example:

dhname-cluster-1::*>object-store-server bucket policy statement create -bucket test -effect allow -principal group/project1, group/Administrators -resource test, test/*

(vserver object-store-server bucket policy statement create)

dhname-cluster-1::*>

This approach may be enhanced so that LDAP and directory service groups can also be specified. For example:

dhname-cluster-1::*>object-store-server bucket policy statement create -bucket test -effect allow -principal nasgroup/s3users, group/s3administrators -resource test, test/*

(vserver object-store-server bucket policy statement create)

dhname-cluster-1::*

Storage OS 300 may use the NAS configurations such as local groups, CIFS local groups, LDAP and Network Information Service (NIS) to get the group membership information for the user. Storage OS 300 may then grant/deny access to a user based on user membership of the group. In an embodiment, network blade 310 may call into a security daemon (secd) to fetch the user's CIFS and Unix information and the group's gid/rid information. This information may be cached in the in-memory LRU cache (not shown in FIG. 3) in network blade 310 to avoid repeated calls to the directory service/LDAP/NIS. In an embodiment, the time to live for the cache may be defaulted to one hour and may be modified by the administrator to a maximum value of 24 hours. The cache may also be flushed by the administrator using an advanced level CLI command.

Figure 6:
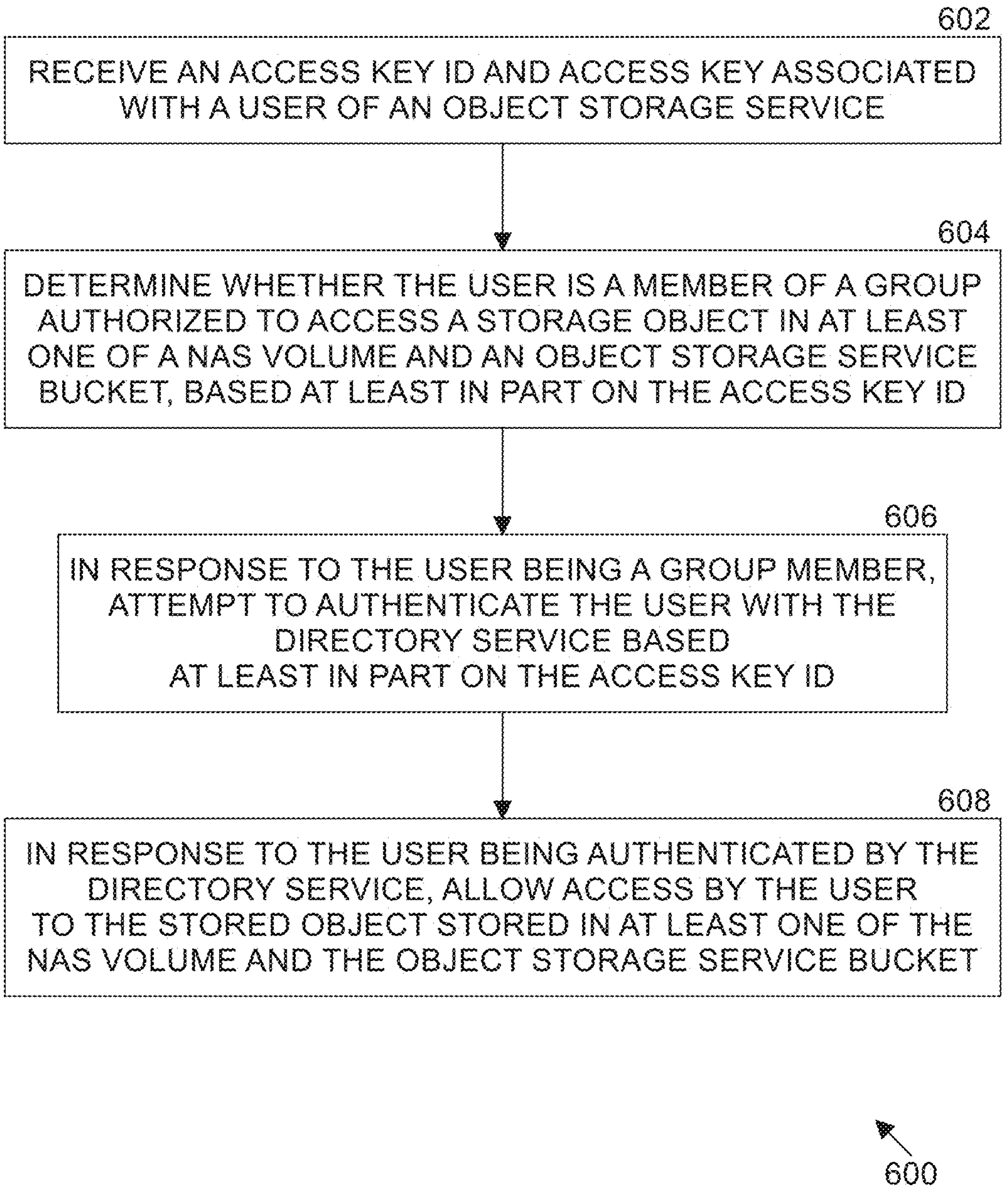
FIG. 6 illustrates processing to manage access to object storage services using a directory service according to an embodiment of the present disclosure.

FIG. 6 illustrates processing to manage access to object storage services using a directory service according to an embodiment of the present disclosure. At block 602, storage OS 300 receives an access key ID and access key 506 associated with a user 502 of an object storage service. At block 604, directory service 510 determines whether the user is a member of a group authorized to access a storage object in at least one of a NAS volume 402 and an object storage service bucket 404, based at least in part on the access key ID. At block 606, in response to the user 502 being a group member, the storage OS 300 attempts to authenticate the user with the directory service 510 based at least in part on the access key ID and the access key 506. At block 608, in response to the user being authenticated by the directory service, the storage OS allows access by the user to the stored object stored in at least one of the NAS volume 402 and the object storage service bucket 404.

Embodiments of the present disclosure include various steps, which have been described above. The steps may be performed by hardware components or may be embodied in machine-executable instructions, which may be used to cause one or more processing resources (e.g., one or more general-purpose or special-purpose processors such as processor circuitry) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program processor circuitry of a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors (e.g., processors 222*a*-*b*) within a single computer) and storage systems containing or having network access to computer program(s) coded in accordance with various methods described herein, and the method steps associated with embodiments of the present disclosure may be accomplished by modules, routines, subroutines, or subparts of a computer program product.

The term "storage media" as used herein refers to any non-transitory media that stores data or instructions that cause a machine to operate in a specific fashion. Such storage media may comprise non-volatile media or volatile media. Non-volatile media includes, for example, optical, magnetic or flash disks, such as a storage device (e.g., local storage 230). Volatile media includes dynamic memory, such as main memory (e.g., memory 224). Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus (e.g., system bus 223). Transmission media can also take the form of acoustic or light waves, such as those generated during radio-wave and infra-red data communications.

Various forms of media may be involved in carrying one or more sequences of one or more instructions to the one or more processors (processor circuitry) for execution. For example, the instructions may initially be carried on a magnetic disk or solid-state drive of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector can receive the data carried in the infra-red signal and appropriate circuitry can place the data on bus. Bus carries the data to main memory (e.g., memory 224), from which the one or more processors retrieve and execute the instructions. The instructions received by main memory may optionally be stored on storage device either before or after execution by one or more processors.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:

receiving, by a storage operating system in a computing system, an access key identifier (ID) and access key associated with a user of an object storage service;

determining, by a directory service, whether the user is a member of a group authorized to access a storage object in at least one of a network accessible storage volume or an object storage service bucket, based at least in part on the access key ID;

in response to the user being a group member, attempting to authenticate the user by the storage operating system with the directory service based at least in part on the access key ID and the access key; and in response to the user being authenticated by the directory service, allowing, by the storage operating system, access by the user to the storage object stored in at least one of the network accessible storage volume or the object storage service bucket.

2. The method of claim 1, comprising authenticating the user by implementing a bind request, the bind request including a fast bind mode of the directory service.

3. The method of claim 1, wherein an object storage service bucket policy of an object storage service defines access to the storage object stored in the network accessible storage volume.

4. The method of claim 1, comprising accessing the network accessible storage volume by a first protocol and accessing the object storage service bucket by a second protocol.

5. The method of claim 4, wherein the first protocol is at least one of a network file system protocol or a common internet file system protocol and the second protocol is an object storage services protocol.

6. The method of claim 4, wherein the access by the user to the storage object stored in the network accessible storage volume comprises at least one of a read operation of the storage object from the network accessible storage volume or a write operation to the storage object in the network accessible storage volume using the first protocol.

7. The method of claim 4, wherein the access by the user to the storage object stored in the object storage service bucket comprises at least one of a read operation of the storage object from the object storage service bucket or a write operation to the storage object in the object storage service bucket using the second protocol.

8. A system comprising:

processor circuitry; and instructions that when executed by the processor circuitry cause the system to:

receive, by a storage operating system in a computing system, an access key identifier (ID) and access key associated with a user of an object storage service;

determine, by a directory service, whether the user is a member of a group authorized to access a storage object in at least one of a network accessible storage volume or an object storage service bucket, based at least in part on the access key ID;

in response to the user being a group member, attempt to authenticate the user by the storage operating system with the directory service based at least in part on the access key ID and the access key; and in response to the user being authenticated by the directory service, allow, by the storage operating system, access by the user to the storage object stored in at least one of the network accessible storage volume or the object storage service bucket.

9. The system of claim 8, comprising instructions to authenticate the user by implementing a bind request, the bind request including a fast bind mode of the directory service.

10. The system of claim 8, wherein an object storage service bucket policy of an object storage service defines access to the storage object stored in the network accessible storage volume.

11. The system of claim 8, comprising instructions to access the network accessible storage volume by a first protocol and access the object storage service bucket by a second protocol.

12. The system of claim 11, wherein the first protocol is at least one of a network file system protocol and a common internet file system protocol or the second protocol is an object storage services protocol.

13. The system of claim 11, wherein instructions to access the storage object stored in the network accessible storage volume comprise instructions to perform at least one of a read operation of the storage object from the network accessible storage volume or a write operation to the storage object in the network accessible storage volume using the first protocol.

14. The system of claim 11, wherein instructions to access the storage object stored in the object storage service bucket comprise instructions to perform at least one of a read operation of the storage object from the object storage service bucket or a write operation to the storage object in the object storage service bucket using the second protocol.

15. A non-transitory, machine-readable medium storing instructions, which when executed by processing circuitry of a computing system, cause the computing system to:

receive, by a storage operating system in the computing system, an access key identifier (ID) and access key associated with a user of an object storage service;

determine, by a directory service, whether the user is a member of a group authorized to access a storage object in at least one of a network accessible storage volume or an object storage service bucket, based at least in part on the access key ID;

in response to the user being a group member, attempt to authenticate the user by the storage operating system with the directory service based at least in part on the access key ID and the access key; and in response to the user being authenticated by the directory service, allow, by the storage operating system, access by the user to the storage object stored in at least one of the network accessible storage volume or the object storage service bucket.

16. The non-transitory, machine-readable medium of claim 15, comprising instructions to authenticate the user by implementing a bind request, the bind request including a fast bind mode of the directory service.

17. The non-transitory, machine-readable medium of claim 15, wherein an object storage service bucket policy of an object storage service defines access to the storage object stored in the network accessible storage volume.

18. The non-transitory, machine-readable medium of claim 15, comprising instructions to access the network accessible storage volume by a first protocol and access the object storage service bucket by a second protocol.

19. The non-transitory, machine-readable medium of claim 18, wherein the first protocol is at least one of a network file system protocol or a common internet file system protocol and the second protocol is an object storage services protocol.

20. The non-transitory, machine-readable medium of claim 18, wherein instructions to access the storage object stored in the network accessible storage volume comprise instructions to perform at least one of a read operation of the storage object from the network accessible storage volume or a write operation to the stored object in the network accessible storage volume using the first protocol, and instructions to access the storage object stored in the object storage service bucket comprise instructions to perform at least one of a read operation of the storage object from the object storage service bucket or a write operation to the storage object in the object storage service bucket using the second protocol.

* * * * *